(12) United States Patent
Aparimarn et al.

(10) Patent No.: US 8,804,286 B1
(45) Date of Patent: Aug. 12, 2014

(54) SWAGE COUPLING ASSEMBLY

(71) Applicant: Seagate Technology LLC, Cupertino, CA (US)

(72) Inventors: Prapan Aparimarn, Bangkok (TH); Joompondej Bamrungwongtaree, Bangkok (TH)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/790,609

(22) Filed: Mar. 8, 2013

(51) Int. Cl.
*G11B 5/48* (2006.01)
*G11B 21/16* (2006.01)

(52) U.S. Cl.
USPC ................................. 360/244.6; 360/265.9

(58) Field of Classification Search
CPC .. G11B 5/4833; G11B 5/4813; G11B 5/4826; G11B 5/486; G11B 5/4873; G11B 5/4806; G11B 5/4853; G11B 5/484
USPC .............. 360/244.5, 244.6, 265.9, 266, 266.1
See application file for complete search history.

(56) References Cited

U.S. PATENT DOCUMENTS

| | | | |
|---|---|---|---|
| 5,497,282 A * | 3/1996 | Hoffmann et al. ............ | 360/244 |
| 5,602,698 A | 2/1997 | Miyazaki et al. | |
| 5,689,389 A * | 11/1997 | Braunheim ................ | 360/244.6 |
| 5,717,545 A | 2/1998 | Brooks, Jr. et al. | |
| 5,796,555 A * | 8/1998 | Aoyagi et al. ............. | 360/244.6 |
| 6,033,755 A * | 3/2000 | Hanrahan et al. ............ | 428/131 |
| 6,128,164 A | 10/2000 | Kant et al. | |
| 6,198,602 B1 | 3/2001 | Vera et al. | |
| 6,368,685 B1 | 4/2002 | Schmidt et al. | |
| 6,372,314 B1 | 4/2002 | Schmidt et al. | |
| 6,372,315 B1 | 4/2002 | Schmidt et al. | |
| 6,456,463 B1 * | 9/2002 | Van Sloun ................ | 360/266.1 |
| 6,457,304 B1 * | 10/2002 | Bedford et al. ............ | 59/7 |
| 6,564,539 B2 * | 5/2003 | Bedford et al. ............ | 59/7 |
| 6,754,044 B1 | 6/2004 | Braunheim et al. | |
| 6,757,136 B2 | 6/2004 | Buske et al. | |
| 6,940,696 B2 * | 9/2005 | Takagi et al. ............. | 360/244.6 |
| 7,042,680 B1 * | 5/2006 | Zhang et al. ............. | 360/244.6 |
| 7,130,156 B1 | 10/2006 | Fossum | |
| 7,339,767 B1 * | 3/2008 | Zhang et al. ............. | 360/244.6 |
| 7,502,204 B2 | 3/2009 | White et al. | |
| 7,633,717 B1 * | 12/2009 | Fossum et al. ........... | 360/244.6 |
| 8,159,789 B2 | 4/2012 | Fujimoto et al. | |
| 8,339,745 B2 * | 12/2012 | Yabu et al. ............... | 360/244.6 |
| 2006/0174472 A1 * | 8/2006 | Zhang et al. ............. | 29/603.03 |

* cited by examiner

*Primary Examiner* — Brian Miller
(74) *Attorney, Agent, or Firm* — Leanne Taveggia Farrell; Westman, Champlin & Koehler, P.A.

(57) ABSTRACT

A mount plate includes a flange having a first surface and an opposing second surface and a boss tower having a swage hole and extending from an area where the boss tower meets the first surface of the flange to an end surface of the boss tower. The boss tower has an inner diameter defining an inner surface of the swage hole, an outer diameter defining a portion of an outer surface of the boss tower and at least one cut-out portion formed in the boss tower along an obliquely angled plane. The cut-out portion intersects with the outer surface at a first area located a first distance from where the boss tower meets the first surface of the flange and intersects with the end surface at a second area located a second distance from the inner diameter. The first distance is less than the second distance.

16 Claims, 15 Drawing Sheets

SWAGE COUPLING ASSEMBLY

BACKGROUND

Ball swaging is one type of material processing technique used to assemble two components together. The first component includes a boss tower and the second component includes an aperture. The boss tower is inserted into the aperture in the second component. A swage ball is inserted into the boss tower to swage couple the boss tower to the aperture. During this process, the swage ball, which has a larger diameter than an inner diameter of the boss, applies a compression force to the inner surface of the boss tower such that the boss tower expands to hold the second component to the first component.

The discussion above is merely provided for general background information and is not intended to be used as an aid in determining the scope of the claimed subject matter.

SUMMARY

A mount plate includes a flange having a first surface and an opposing second surface and a boss tower having a swage hole and extending from an area where the boss tower meets the first surface of the flange to an end surface of the boss tower. The boss tower includes an inner diameter defining an inner surface of the swage hole, an outer diameter defining a portion of an outer surface of the boss tower and at least one cut-out portion formed in the boss tower along an obliquely angled plane. The at least one cut-out portion intersects with the portion of the outer surface defined by the outer diameter at a first area that is located a first distance from where the boss tower meets the first surface of the flange and intersects with the end surface at a second area that is located a second distance from the inner diameter. The first distance is less than the second distance.

In a further embodiment, the mount plate is a second component of a swage coupling assembly that is coupled to a first component having an aperture. The first area and the second area of the at least one cut-out portion define a remaining portion of the outer surface of the boss tower. When the boss tower of the second component is inserted into the aperture in the first component, only the portion of the outer surface of the boss tower that is defined by the outer diameter engages with the aperture in the first component.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Embodiments described herein include a first component having a boss tower for swaging the first component to a second component in an electro-mechanical system. In one example and as illustrated, a head gimbal assembly (HGA) having the first component is ball swaged to an actuator arm or the second component to form a head stack assembly (HSA) in a data storage device. The HGA includes a load arm or suspension having a mount or base plate with a boss tower. The boss tower is inserted into an aperture in the actuator arm and a swage ball is inserted into a swage hole of the boss tower to swage couple the boss tower to the aperture. During this forging-type process, the swage ball, which has a larger diameter than an inner diameter of the boss tower, applies a compressive force to an inner surface of the boss tower such that the boss tower expands to hold the actuator arm to the suspension.

Embodiments of the boss tower, as described herein, include portions or a portion having a height that is reduced. A reduction in height improves the quality and performance of the HSA. In one embodiment, the reduction in height of portions or portions of a boss tower provides the boss tower with a radially asymmetric shape resulting in the HGA and the actuator arm being in engagement under unequal compressive forces in pitch and roll. For example, the compressive force in the roll direction can be more than the compressive force in the pitch direction. Such unequal compressive forces reduce deformation in the actuator arm at or near the aperture in the actuator arm.

Figure 1:
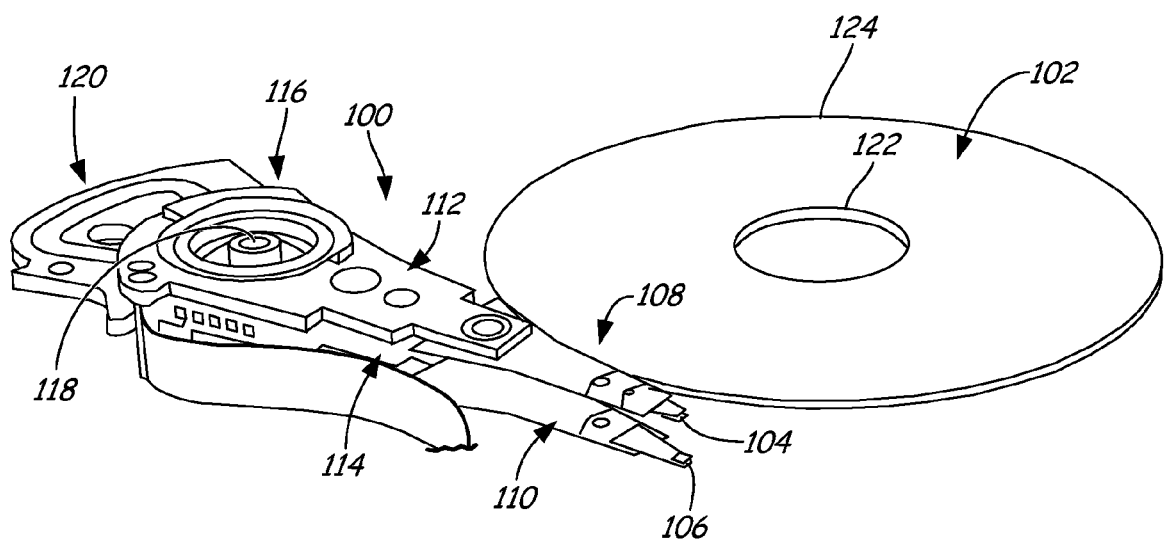
FIG. 1 illustrates a perspective view of exemplary components of a data storage device including a head stack assembly and a medium.

FIG. 1 illustrates a perspective view of exemplary components of a data storage device including a head stack assembly 100 and medium 102. Medium 102 stores information on a plurality of circular, concentric data tracks and is mountable to a spindle motor assembly that can rotate medium 102 and cause its data surfaces to pass under respective bearing slider surfaces. As illustrated, each surface of medium 102 has an associated header or slider 104 and 106, which carries transducers that communicate with a surface of medium 102.

Each slider 104 and 106 is supported by a head gimbal assembly (HGA) 108 and 110, which are in turn attached to an actuator arm 112 and 114 of an actuator mechanism 116 to form a Head Stack Assembly (HSA) 100. Actuator mechanism 116 is rotated about a shaft 118 by a voice coil motor 120, which is controlled by servo control circuitry. Voice coil motor 120 rotates actuator mechanism 116 to position sliders 104 and 106 relative to desired data tracks between an inner diameter 122 and an outer diameter 124 of medium 102.

Figure 2:
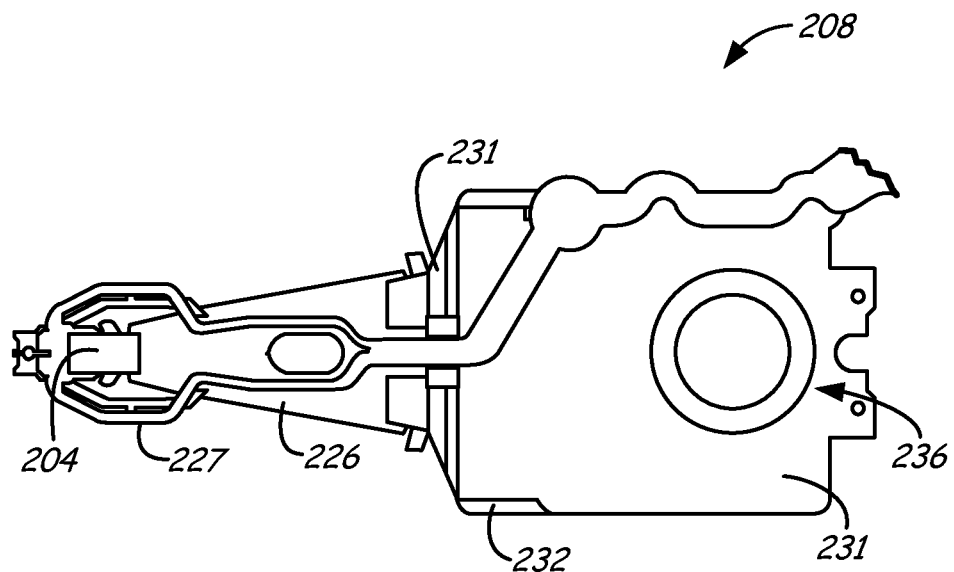
FIG. 2 illustrates a bottom view of an exemplary head gimbal assembly, which embodiments of the disclosure are useful.
Figure 3:
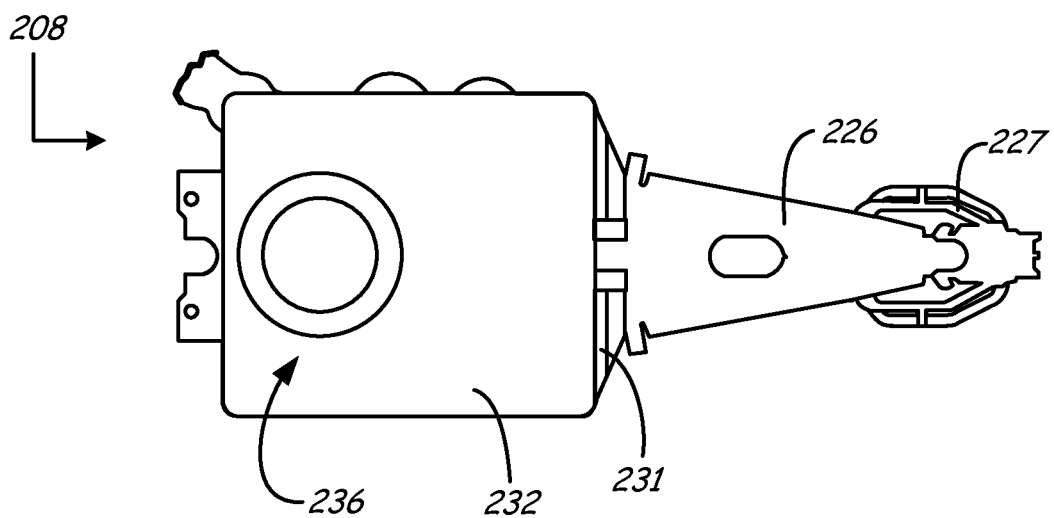
FIG. 3 illustrates a top view of the head gimbal assembly illustrated in FIG. 2.

FIG. 2 illustrates a bottom view and FIG. 3 illustrates a top view of an exemplary HGA 208, in which embodiments of the disclosure are useful. HGA 208 includes a load beam or suspension 226, a gimbal or flexure 227, a hinge 231 and a mount or base plate 232. Load beam 226 supports a header or slider 204 carrying transducers via gimbal or flexure 227. For example, a gimbal is typically integrated into load beam 226, while a flexure is a separate component that can be laser welded to load beam 226 and pivotable about a dimple. Regardless of type, gimbal or flexure 227 is the feature to which header or slider 204 is attached.

Hinge 231 provides load beam 226 with a preload force. The preload force forces header or slider 104 towards the surface of a medium. In some embodiments, hinge 231 is a separate component from load beam 226 and is connected to load beam 226 by laser welding. In other embodiments, hinge 231 is integrated with load beam 226 as a single part. Mount plate 232 provides an attachment structure for coupling an actuator arm, such as actuator arm 112 in FIG. 1, to HGA 208. In one embodiment, mount plate 232 is laser welded to hinge 231. As illustrated in FIGS. 2 and 3, the attachment structure is a boss tower 236 that is configured to insert into an aperture in the actuator arm and undergo a swaging process, such as ball swaging, to couple the actuator arm to HGA 208.

Figure 4:
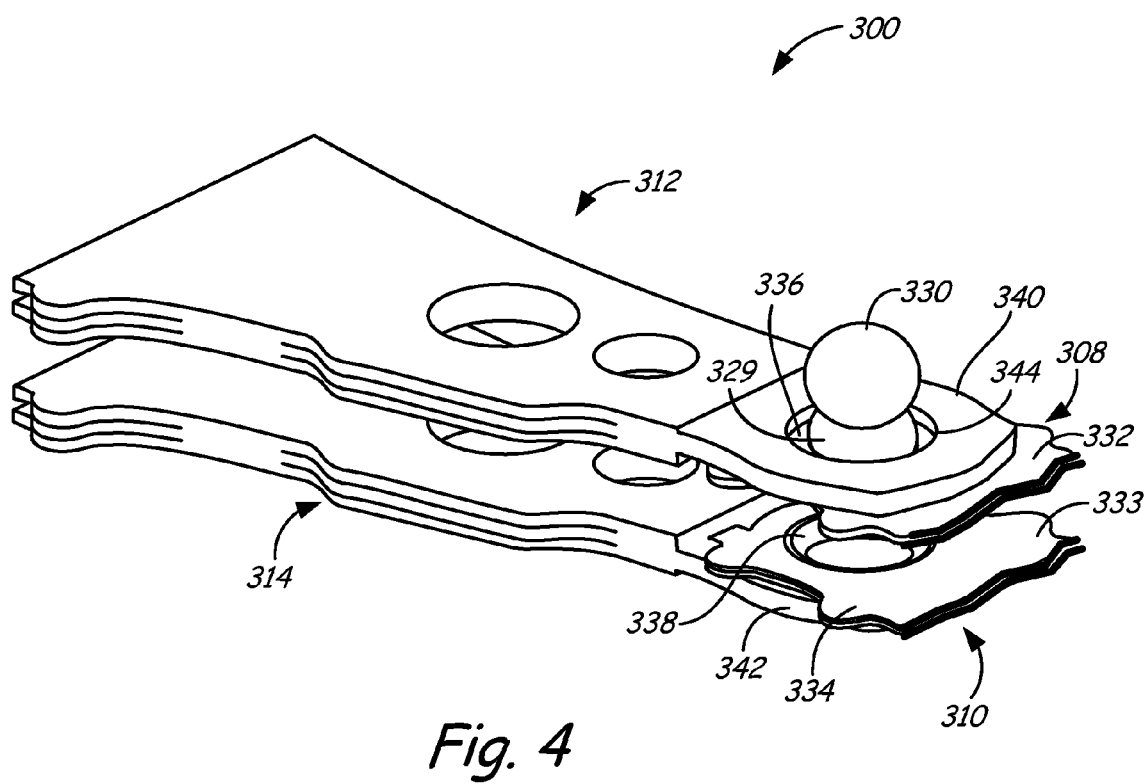
FIG. 4 illustrates an enlarged perspective view of a portion of a head stack assembly including portions of two actuator arms, portions of two head gimbal assemblies and two exploded swage balls according to one embodiment.

FIG. 4 illustrates an enlarged perspective view of a portion of a head stack assembly (HSA) 300 including portions of two actuator arms 312 and 314, portions of the two HGAs 308 and 310 and two exploded swage balls 329 and 330. Although each HGA 308 and 310 includes a load beam or suspension for supporting a slider and a separate hinge for coupling the load beam to a mount plate, as illustrated in FIG. 4, the portions of the two HGAs 308 and 310 illustrate a portion of a hinge (of which only hinge 333 on HGA 210 is visible) and mount plates 332 and 334. Each mount plate 332 and 334 includes an integrally formed boss tower 336 and 338 made of the same material as the mount plate. For example, mount plates 332 and 334 can be made of a ferrite, such as stainless steel, aluminum, engineered plastic and the like. Each actuator arm 312 and 314 includes an arm pad 340 and 342 having apertures. In FIG. 4, only aperture 344 of arm pad 340 is visible, while the aperture of arm pad 342 is hidden from view.

Figure 5:
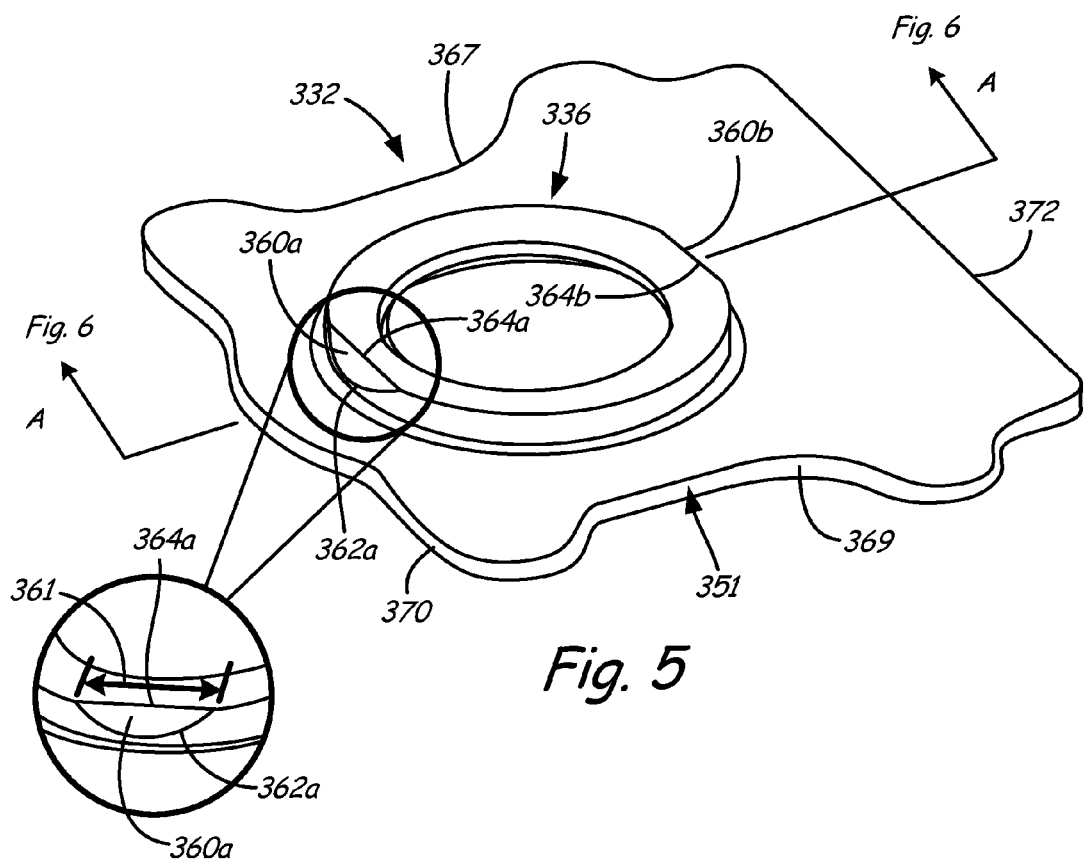
FIG. 5 illustrates a perspective view of a mount plate of one of the head gimbal assemblies illustrated in FIG. 4.
Figure 6:
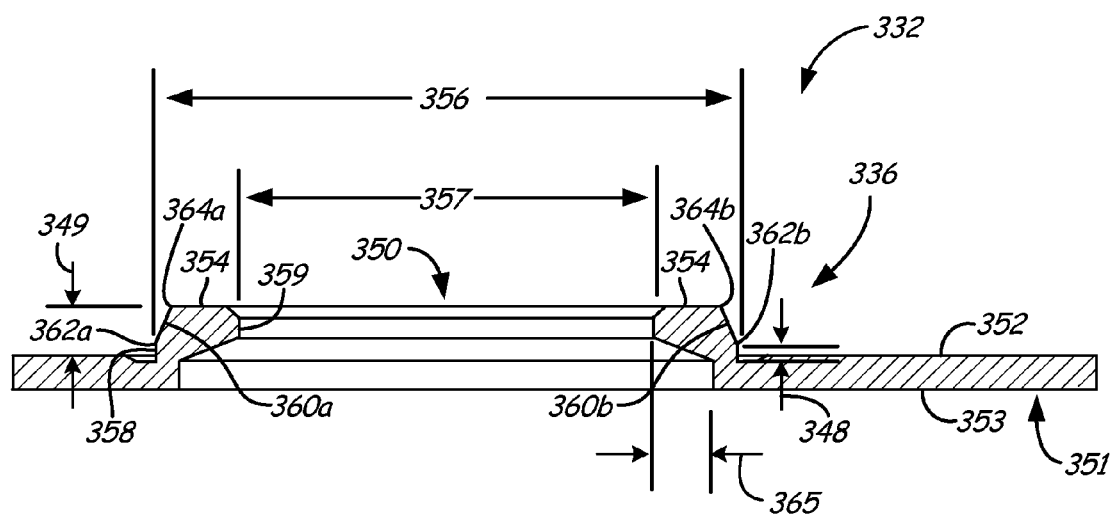
FIG. 6 illustrates a section view of the mount plate illustrated in FIG. 5.

FIG. 5 illustrates a perspective view of mount plate 332 and FIG. 6 illustrates a section view of mount plate 332 taken along the section line denoted in FIG. 5. Mount plate 332 includes a flange or plate 351 and a boss tower 336. Flange or plate 351 has a first surface 352, an opposing second surface 353, first and second lateral edges 367 and 369, a distal edge 370 and a proximal edge 372. First and second lateral edges 367 and 369 couple distal edge 370 to proximal edge 372. Distal edge 370 is located distal to a load beam on a HGA, such as load beam 226, and proximal edge 372 is located proximal to the load beam, such as load beam 226. Boss tower 336 is a projecting feature formed integrally with mount plate 332 and extends from an area where boss tower 336 meets first surface 352 of flange 351 to an end surface 354. Boss tower 336 includes an outer surface 358, a boss tower height and a swage hole 350. Swage hole 350 includes an inner surface 359 that is defined by an inner diameter 357. Swage hole 350 extends completely through mount plate 332 from second surface 353 to end surface 354.

In general, the boss tower height of boss tower 336 is defined approximately between where boss tower 336 meets first surface 352 of flange or plate 351 and end surface 354. However, in the embodiment illustrated in FIGS. 5 and 6, boss tower 336 includes a variable boss height that varies between a minimum boss tower height 348 and a maximum boss tower height 349. Maximum boss tower height 349 is the distance between where boss tower 336 meets first surface 352 of flange 352 and end surface 354, while minimum boss tower height 348 is a distance that is less than the distance between where boss tower 336 meets first surface 352 and end surface 354. For example, maximum boss tower height 349 can be approximately 0.218 mm, while minimum boss tower height 248 can be approximately 0.00417 mm. An outer diameter 356 of boss tower 336 is defined by the radial symmetric portion of outer surface 358. Therefore, while most of outer surface 358 of boss tower 336 is defined by outer diameter 356, portions of outer surface 358 are not.

To create a variable boss tower height, at least a portion of the material of boss tower 336 is removed. In particular, at least one cut-out portion 360 is formed in boss tower 336 along an obliquely angled plane. A cut-out length 361 of cut-out portion 360 is dependent upon the sizes of outer diameter 356 and inner diameter 357. As illustrated in FIGS. 5 and 6, boss tower 336 includes two cut-out portions 360a and 360b located radially opposite from each other. Both cut-out portions 360a and 360b intersect with a portion of outer surface 358 that is defined by outer diameter 356 of boss tower 336 at first areas 362a and 362b and intersect with end surface 354 at second areas 364a and 364b. In the embodiment illustrated in FIGS. 5 and 6, first areas 362a and 362b of first and second cut-out portions 360a and 360b are located a first distance 348 (i.e., minimum boss height 348) from where boss tower 336 meets first surface 352 and second areas 364a and 364b of first and second cut-out portions 360a and 360b are located a second distance 365 from inner surface 359 of swage hole 350. As illustrated in FIG. 6, first distance 348 is less than second distance 365.

In the enlarged illustration in FIG. 5, first areas 362a and 362b form a lower boundary or ridge of cut-out portion 360 and are convex along outer surface 358. The lower boundary is convex because the obliquely angled plane communicates with the portion of outer surface 358 defined by outer diameter 356 of boss tower 336 in this way. Second areas 364a and 364b form an upper boundary or ridge of cut-out portion 360 and do not behave in the same way. Rather, second areas 364a and 364b form a linear or slightly convex boundary or ridge along end surface 354. The upper boundary is linear or slightly convex because the obliquely angled plane communicates with the substantially flat end surface 354 in this way. Together, lower boundaries 362a and 362b and upper boundaries 364a and 364b of cut-out portions 360a and 360b define remaining portion of outer surface 358 of boss tower 336.

Figure 7:
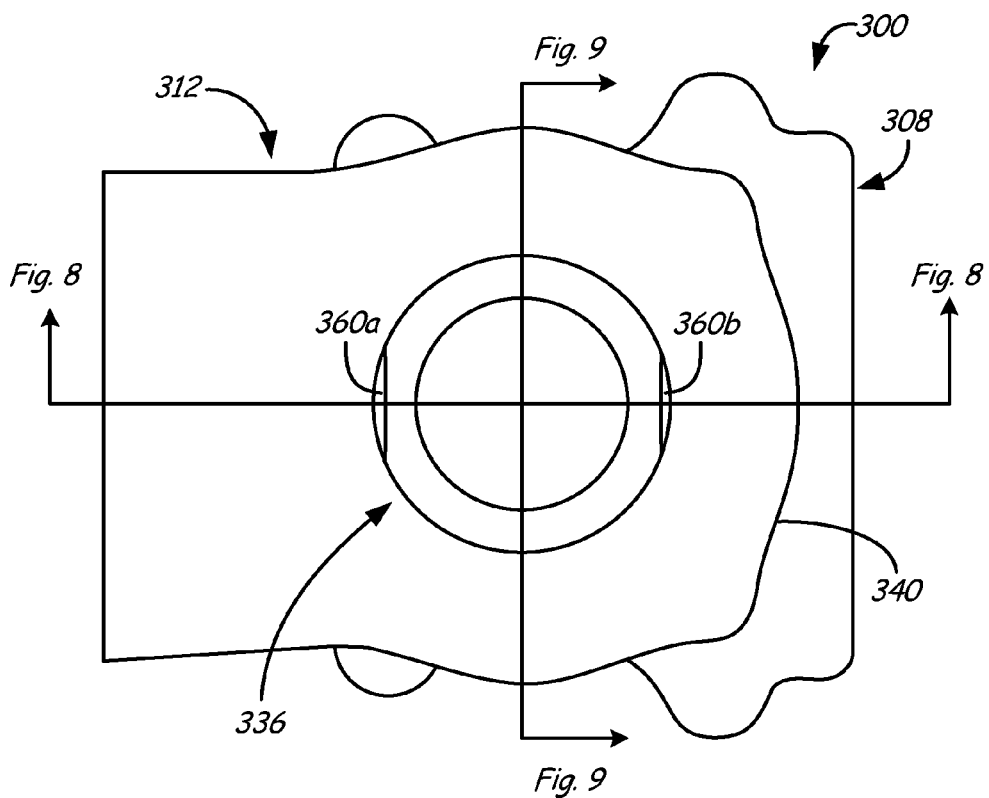
FIG. 7 illustrates an enlarged top view of a portion of the head stack assembly illustrated in FIG. 4 including a portion of an actuator arm and a portion of a head gimbal assembly before the boss tower is swaged to the aperture in the actuator arm according to one embodiment.
Figure 8:
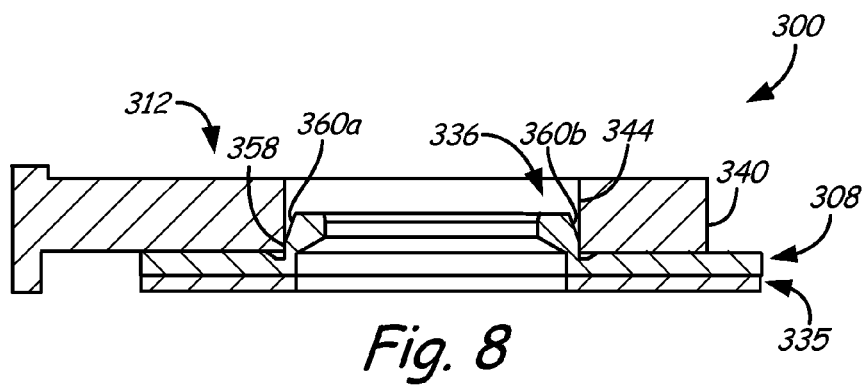
FIG. 8 illustrates a section view of the portion of the head stack assembly taken along the section line denoted in FIG. 7.

FIG. 7 illustrates an enlarged top view of a portion of HSA 300 including a portion of upper most actuator arm 312 and a portion of HGA 308 including mount plate 332 and hinge 335 before boss tower 336 is swaged to aperture 344 in actuator pad 340 according to one embodiment. FIG. 8 illustrates a section view of the unswaged portion of HSA 300 taken along a section line illustrated in FIG. 7 and FIG. 9 illustrates a section view of the unswaged portion of HSA 300 taken along a different section line illustrated in FIG. 7.

Figure 9:
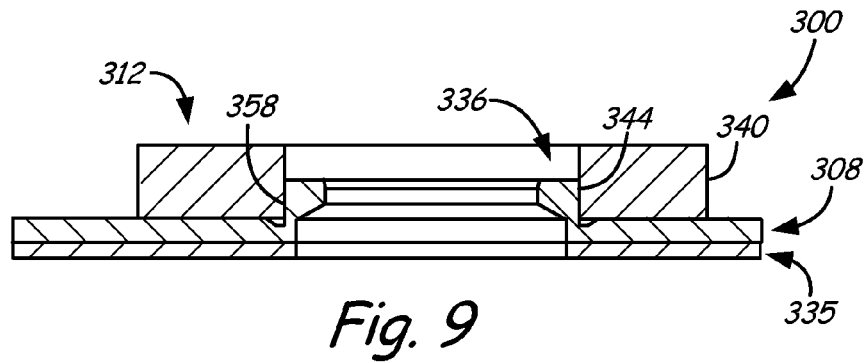
FIG. 9 illustrates a section view of the portion of the head stack assembly taken along the section line denoted in FIG. 7.

As illustrated in FIGS. 8 and 9, boss tower 336 is inserted into aperture 344. As illustrated in FIG. 9, the entire height or outer surface 358 of boss tower 336 is shown engaged with a surface of aperture 344, while in FIG. 8, only a portion of outer surface 358 is shown engaged with the surface of aperture 344. This is because FIG. 8 illustrates cut-out portions 360a and 360b. Cut-out portions 360a and 360b prevent the entire outer surface 358 of boss tower 336 from engaging aperture 344. The portion of outer surface 358 that engages with aperture 344 before swaging is the portion of outer surface 358 that is defined by outer diameter 356. The portion of outer surface 358 that does not engage with aperture 344 before swaging is a remaining portion of outer surface 358 not defined by outer diameter 356. A reduction in the amount of area that outer surface 358 of boss tower 336 engages aperture 344 in actuator arm 312 or the partial reduction in boss tower height provides boss tower with the ability to swage couple to aperture 344 of actuator arm 312 with an unequal compression force.

Figure 10:
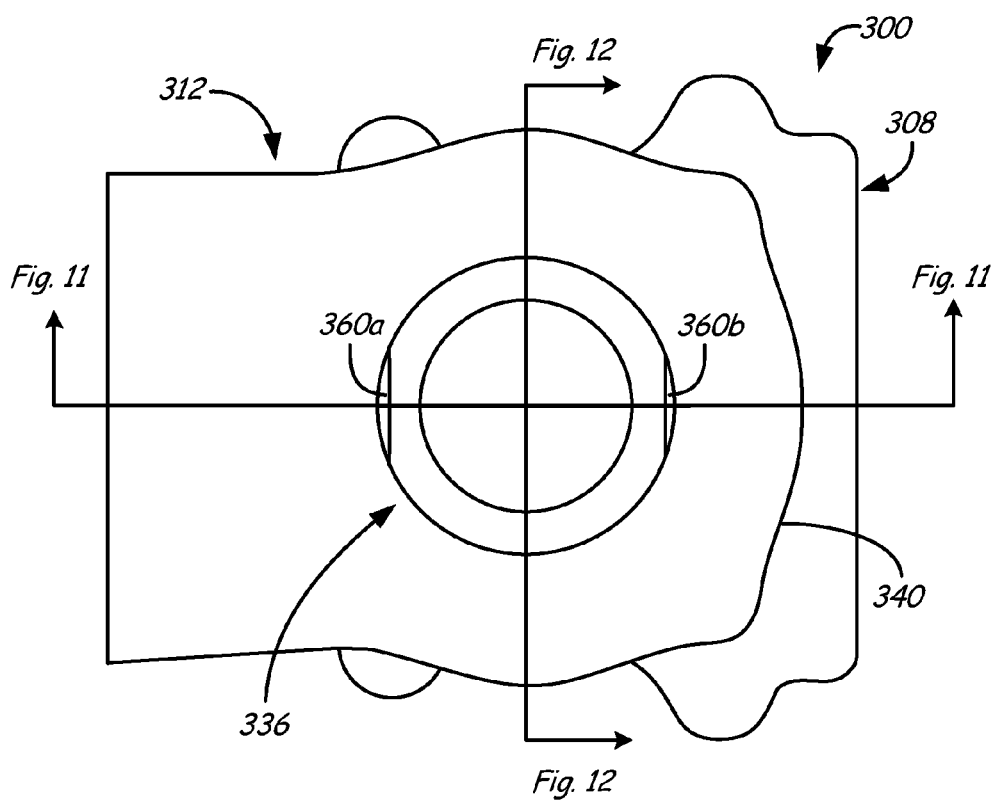
FIG. 10 illustrates an enlarged top view of the portion of the head stack assembly of FIG. 7 after the boss tower is swaged to the aperture in the actuator arm according to one embodiment.
Figure 11:
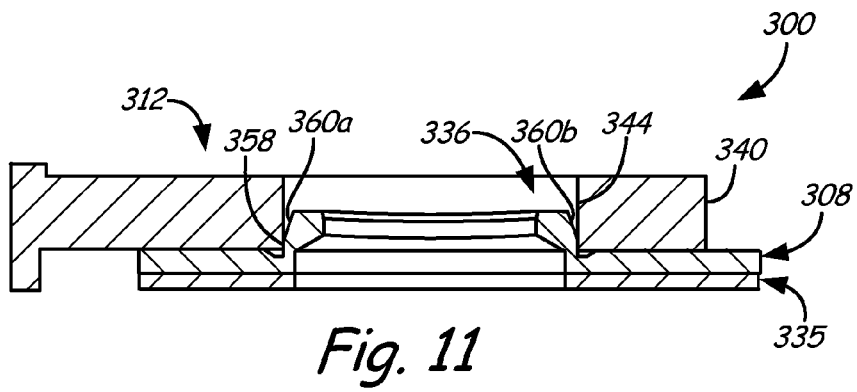
FIG. 11 illustrates a section view of the portion of the head stack assembly taken along the section line denoted in FIG. 9.

FIG. 10 illustrates an enlarged top view of a portion of HSA 300 including a portion of upper most actuator arm 312 and a portion of HGA 308 including mount plate 332 and hinge 335 after boss tower 336 is swage coupled to aperture 344 in actuator pad 340 according to one embodiment. FIG. 11 illustrates a section view of the swaged portion of HSA 300 taken along a section line illustrated in FIG. 10 and FIG. 9 illustrates a section view of the swaged portion of HSA 300 taken along a different section line illustrated in FIG. 10.

Figure 12:
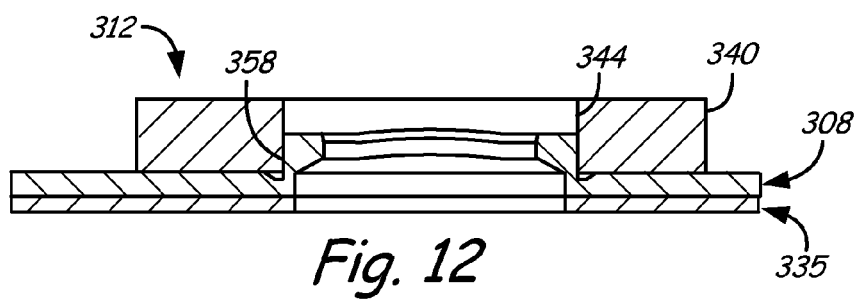
FIG. 12 illustrates a section view of the portion of the head stack assembly taken along the section line denoted in FIG. 10.

As illustrated in FIGS. 11 and 12, when boss tower exerts an unequal compression force on aperture 344 during the swaging process due to cut-out portions 360a and 360b, a reduction of bend in arm pad 340 results, which also means a reduction in swage effect. More particularly, the existence of cut-out portions 360a and 360b provides a greater compression force during swaging that in the roll direction than in the pitch direction.

As illustrated in FIGS. 11 and 12, while boss tower 336 is affected in terms of deformation, actuator pad 342 is not. In addition, the entire height or outer surface 358 of boss tower 336 is still shown in FIG. 12 to be engaged with a surface of aperture 344, while in FIG. 11, only a portion of outer surface 358 is shown engaged with the surface of aperture 344. This is because FIG. 11 illustrates cut-out portions 360a and 360b. Cut-out portions 360a and 360b prevent the entire outer surface 358 of boss tower 336 from engaging with aperture 344. The portion of outer surface 358 that engages with aperture 344 even after swaging is the portion of outer surface 358 that is defined by outer diameter 356. The portion of outer surface 358 that does not engage with aperture 344 even after swaging is the remaining portion of outer surface 358 not defined by outer diameter 356.

Figure 13:
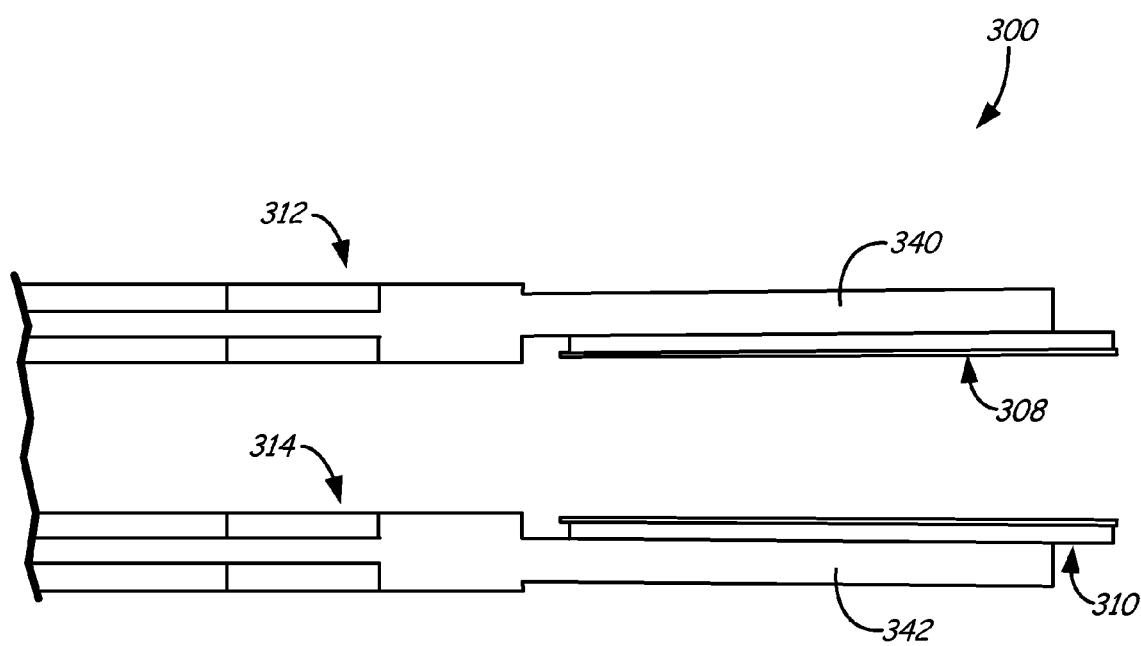
FIG. 13 illustrates an enlarged partial side view of a head stack assembly having two arm pads according to one embodiment.

FIG. 13 illustrates an enlarged side view of a portion of HSA 300 including portions of the two actuator arms 312 and 314 and portions of the two HGAs 308 and 310 after the two HGAs 308 and 310 have been swaged to arm pads 340 and 342. More specifically, FIG. 13 illustrated the substantial absence of bend or deformation in actuator pads 340 and 342 when HGAs 308 and 310 are swaged to actuator arm 310 and 312 using cut-out portions in a boss tower.

Figure 14A:
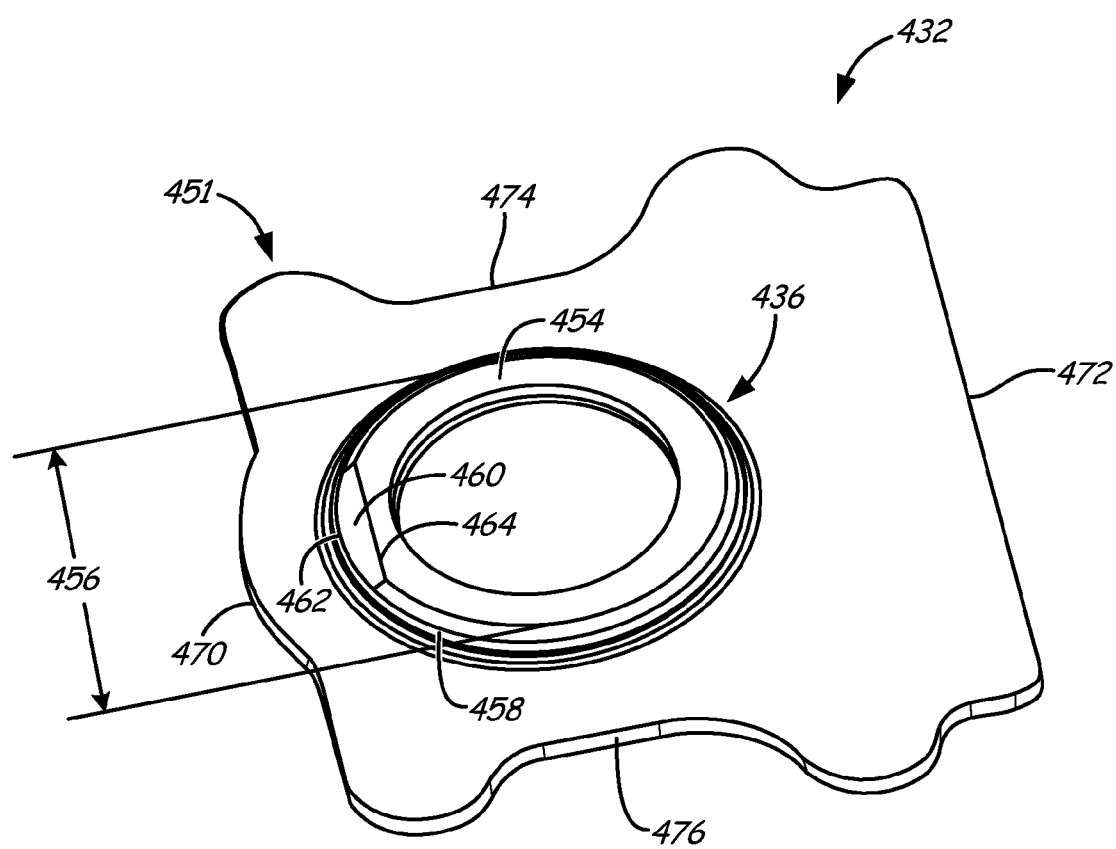
FIGS. 14A-14G illustrate multiple perspective views of various mount plates of various head gimbal assemblies according to different embodiments.

FIG. 14A illustrates a perspective view of a mount plate 432 including a flange or plate 451 and a boss tower 436 according to one embodiment. Flange or plate 451 includes a distal edge 470, a proximal edge 472, a first lateral edge 474 and a second opposing lateral edge 476. The first and second lateral edges 474 and 476 couple distal edge 470 to proximal edge 472. In particular, distal edge 470 is an end on mount plate 432 that is furthest from a load beam of an HGA, while proximal edge is an end on mount plate 432 that is closest to the load beam of the HGA. As illustrated in FIG. 14A, mount plate 432 includes a single cut-out portion 460. Single cut-out portion 460 is formed in boss tower 436 along an obliquely angled plane and includes a lower boundary 462 that intersects with the portion of outer surface 458 of boss tower 436 that is defined by an outer diameter 456 of boss tower 436 and an upper boundary 464 that intersects with end surface 454 of boss tower 436. As illustrated, cut-out portion 460 is located on boss tower in closer proximity to distal edge 470 than proximal edge 472.

Figure 14B:
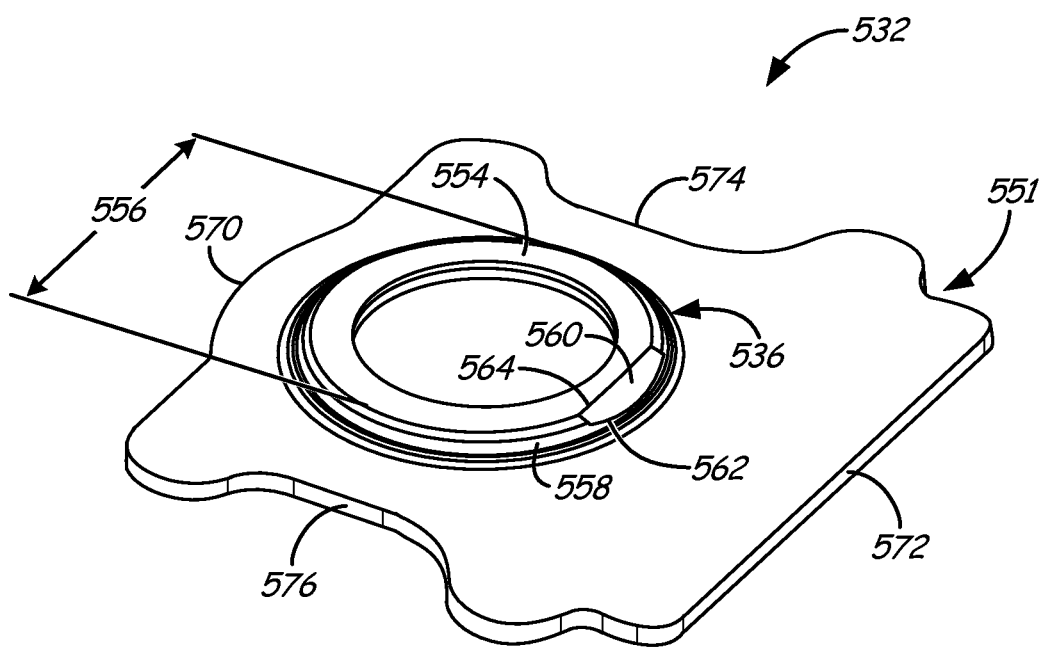

FIG. 14B illustrates a perspective view of a mount plate 532 including a flange or plate 551 and a boss tower 536 according to another embodiment. Flange or plate 551 includes a distal edge 570, a proximal edge 572, a first lateral edge 574 and a second opposing lateral edge 576. The first and second lateral edges 574 and 576 couple distal edge 570 to proximal edge 572. In particular, distal edge 570 is an end on mount plate 532 that is furthest from a load beam of an HGA, while proximal edge is an end on mount plate 532 that is closest to the load beam of the HGA. As illustrated in FIG. 14B, mount plate 532 includes a single cut-out portion 560. Single cut-out portion 560 is formed in boss tower 536 along an obliquely angled plane and includes a lower boundary 562 that intersects with the portion of outer surface 558 of boss tower 536 that is defined by an outer diameter 556 of boss tower 536 and an upper boundary 564 that intersects with end surface 554 of boss tower 536. As illustrated, cut-out portion 560 is located on boss tower in closer proximity to proximal edge 472 than distal edge 470.

Figure 14C:
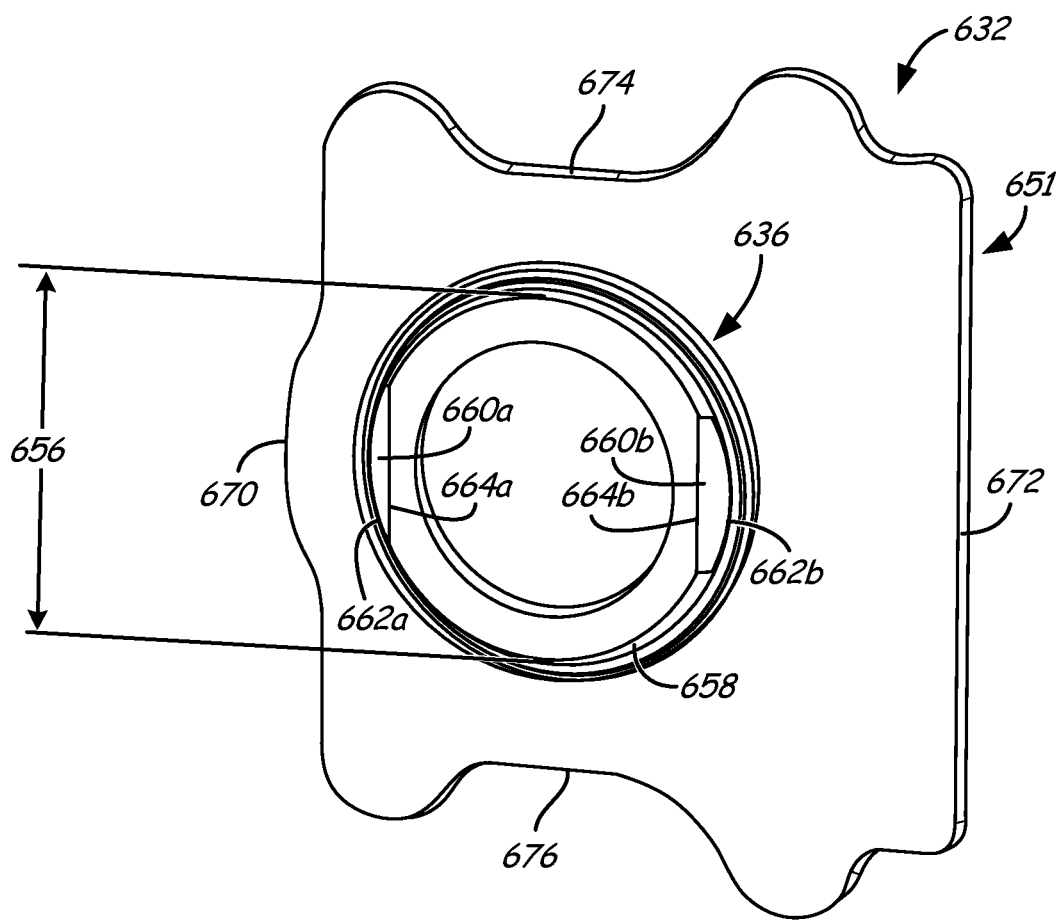

FIG. 14C illustrates a perspective view of a mount plate 632 including a flange or plate 651 and a boss tower 636 according to yet another embodiment. FIG. 14C is similar to mount plate 332 illustrated in FIGS. 4-13. Flange or plate 651 includes a distal edge 670, a proximal edge 672, a first lateral edge 674 and a second opposing lateral edge 676. The first and second lateral edges 674 and 676 couple distal edge 670 to proximal edge 672. In particular, distal edge 670 is an end on mount plate 632 that is furthest from a load beam of an HGA, while proximal edge is an end on mount plate 632 that is closest to the load beam of the HGA. As illustrated in FIG. 14C, mount plate 632 includes two cut-out portions 660a and 660b. Cut-out portion 660a is formed in boss tower 636 along an obliquely angled plane and includes a lower boundary 662a that intersects with the portion of outer surface 658 of boss tower 636 that is defined by an outer diameter 656 of boss tower 636 and an upper boundary 664a that intersects with end surface 654 of boss tower 636. Cut-out portion 660b is formed in boss tower 636 along an obliquely angled plane and includes a lower boundary 662b that intersects with the portion of outer surface 658 of boss tower 636 that is defined by an outer diameter 656 of boss tower 636 and an upper boundary 664b that intersects with end surface 654 of boss tower 636. As illustrated, cut-out portion 660a radially opposes cut-out portion 660b and is located on boss tower 636 in closer proximity to distal edge 470 than proximal edge 472 and cut-out portion 660b is located on boss tower 636 in closer proximity to proximal edge 672 than distal edge 670.

Figure 14D:
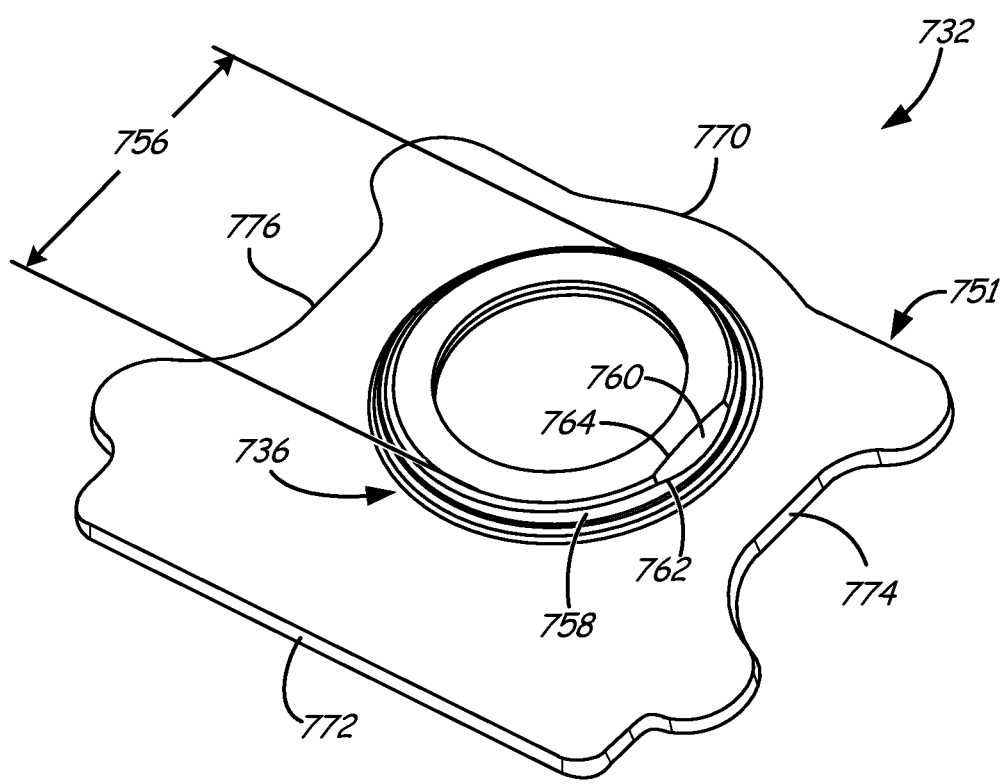

FIG. 14D illustrates a perspective view of a mount plate 732 including a flange or plate 751 and a boss tower 736 according to yet another embodiment. Flange or plate 751 includes a distal edge 770, a proximal edge 772, a first lateral edge 774 and a second opposing lateral edge 776. The first and second lateral edges 774 and 776 couple distal edge 770 to proximal edge 772. In particular, distal edge 770 is an end on mount plate 732 that is furthest from a load beam of an HGA, while proximal edge is an end on mount plate 732 that is closest to the load beam of the HGA. As illustrated in FIG. 14D, mount plate 732 includes a single cut-out portion 760. Single cut-out portion 760 is formed in boss tower 736 along an obliquely angled plane and includes a lower boundary 762 that intersects with the portion of outer surface 758 of boss tower 736 that is defined by an outer diameter 756 of boss tower 736 and an upper boundary 764 that intersects with end surface 754 of boss tower 736. As illustrated, cut-out portion 760 is located on boss tower in closer proximity to first lateral edge 474 than second lateral edge 476.

Figure 14E:
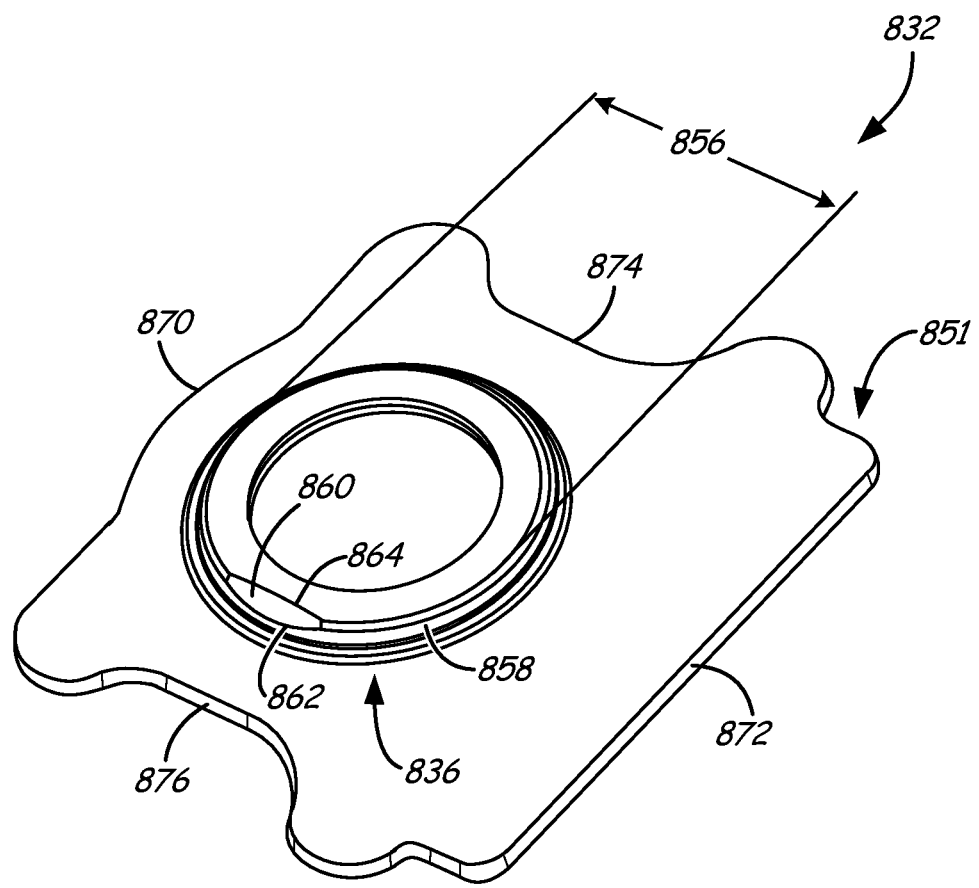

FIG. 14E illustrates a perspective view of a mount plate 832 including a flange or plate 851 and a boss tower 836 according to yet another embodiment. Flange or plate 851 includes a distal edge 870, a proximal edge 872, a first lateral edge 874 and a second opposing lateral edge 876. The first and second lateral edges 874 and 876 couple distal edge 870 to proximal edge 872. In particular, distal edge 870 is an end on mount plate 832 that is furthest from a load beam of an HGA, while proximal edge is an end on mount plate 832 that is closest to the load beam of the HGA. As illustrated in FIG. 14E, mount plate 832 includes a single cut-out portion 860. Single cut-out portion 860 is formed in boss tower 836 along an obliquely angled plane and includes a lower boundary 862 that intersects with the portion of outer surface 858 of boss tower 836 that is defined by an outer diameter 856 of boss tower 836 and an upper boundary 864 that intersects with end surface 854 of boss tower 836. As illustrated, cut-out portion 860 is located on boss tower in closer proximity to second lateral edge 876 than first lateral edge 474.

Figure 14F:
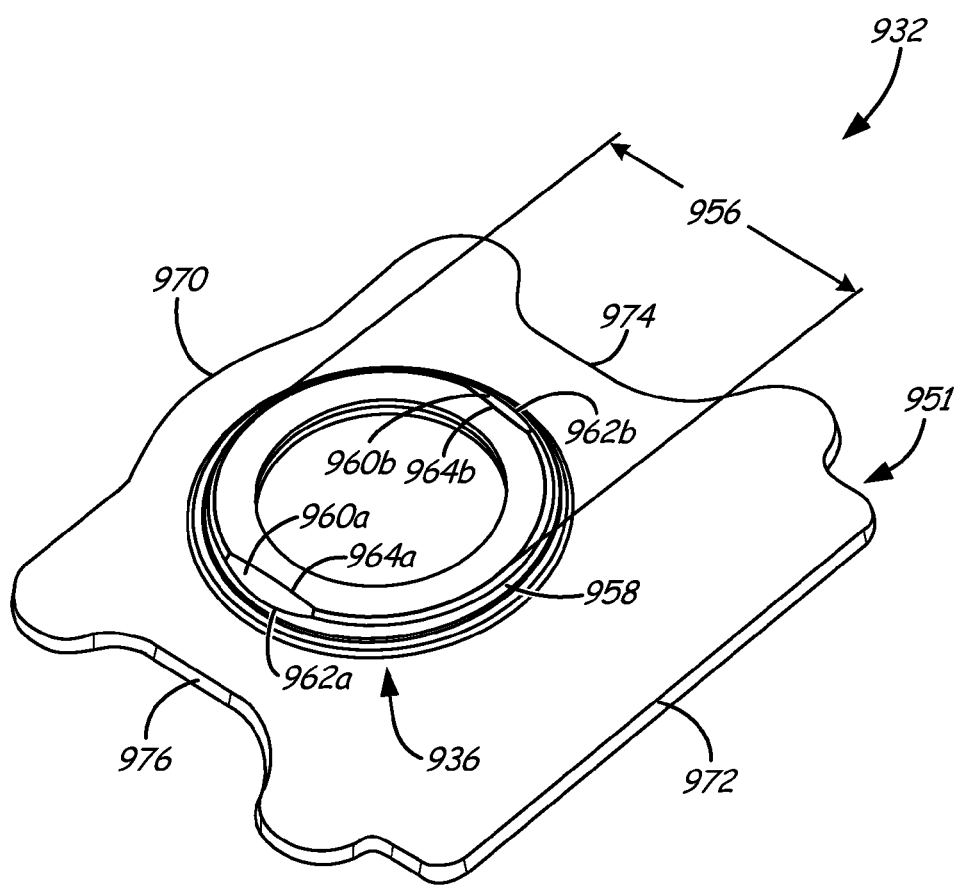

FIG. 14F illustrates a perspective view of a mount plate 932 including a flange or plate 951 and a boss tower 936 according to yet another embodiment. Flange or plate 951 includes a distal edge 970, a proximal edge 972, a first lateral edge 974 and a second opposing lateral edge 976. The first and second lateral edges 974 and 976 couple distal edge 970 to proximal edge 972. In particular, distal edge 970 is an end on mount plate 932 that is furthest from a load beam of an HGA, while proximal edge is an end on mount plate 932 that is closest to the load beam of the HGA. As illustrated in FIG. 14F, mount plate 932 includes two cut-out portions 960a and 960b. Cut-out portion 960a is formed in boss tower 936 along an obliquely angled plane and includes a lower boundary 962a that intersects with the portion of outer surface 958 of boss tower 936 that is defined by an outer diameter 956 of boss tower 936 and an upper boundary 964a that intersects with end surface 954 of boss tower 936. Cut-out portion 960b is formed in boss tower 936 along an obliquely angled plane and includes a lower boundary 962b that intersects with the portion of outer surface 958 of boss tower 936 that is defined by an outer diameter 956 of boss tower 936 and an upper boundary 964b that intersects with end surface 954 of boss tower 936. As illustrated, cut-out portion 960a radially opposes cut-out portion 960b and is located on boss tower 936 in closer proximity to second lateral edge 976 than first lateral edge 974 and cut-out portion 960b is located on boss tower 936 in closer proximity to first lateral edge 974 than second lateral edge 976.

Figure 14G:
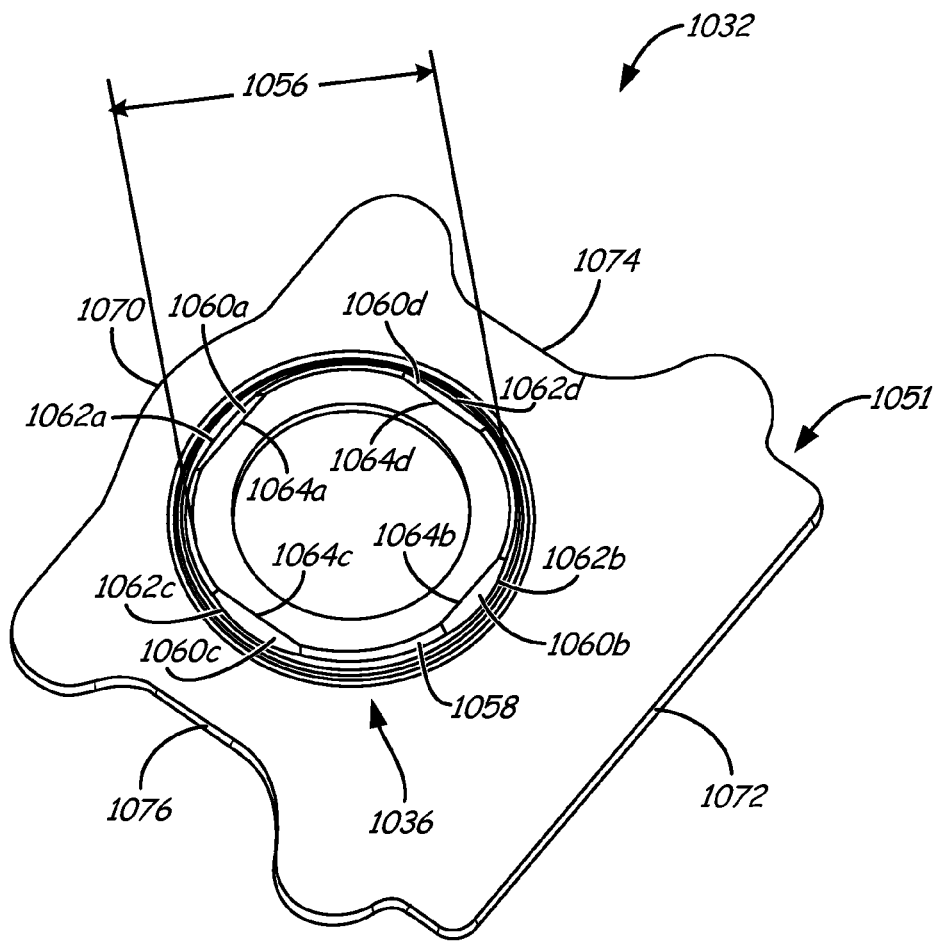

FIG. 14G illustrates a perspective view of a mount plate 1032 including a flange or plate 1051 and a boss tower 1036 according to yet another embodiment. Flange or plate 1051 includes a distal edge 1070, a proximal edge 1072, a first lateral edge 1074 and a second opposing lateral edge 1076. The first and second lateral edges 1074 and 1076 couple distal edge 1070 to proximal edge 1072. In particular, distal edge 1070 is an end on mount plate 1032 that is furthest from a load beam of an HGA, while proximal edge is an end on mount plate 1032 that is closest to the load beam of the HGA. As illustrated in FIG. 14G, mount plate 1032 includes four cut-out portions 1060a, 1060b, 1060c and 1060d. Cut-out portion 1060a is formed in boss tower 1036 along an obliquely angled plane and includes a lower boundary 1062a that intersects with the portion of outer surface 1058 of boss tower 1036 that is defined by an outer diameter 1056 of boss tower 1036 and an upper boundary 1064a that intersects with end surface 1054 of boss tower 1036. Cut-out portion 1060b is formed in boss tower 1036 along an obliquely angled plane and includes a lower boundary 1062b that intersects with the portion of outer surface 1058 of boss tower 1036 that is defined by an outer diameter 1056 of boss tower 1036 and an upper boundary 1064b that intersects with end surface 1054 of boss tower 1036. Cut-out portion 1060c is formed in boss tower 1036 along an obliquely angled plane and includes a lower boundary 1062c that intersects with the portion of outer surface 1058 of boss tower 1036 that is defined by an outer diameter 1056 of boss tower 1036 and an upper boundary 1064c that intersects with end surface 1054 of boss tower 1036. Cut-out portion 1060d is formed in boss tower 1036 along an obliquely angled plane and includes a lower boundary 1062d that intersects with the portion of outer surface 1058 of boss tower 1036 that is defined by an outer diameter 1056 of boss tower 1036 and an upper boundary 1064d that intersects with end surface 1054 of boss tower 1036. As illustrated, cut-out portion 1060a radially opposes cut-out portion 1060b on boss tower 1036 and is in closer proximity to distal edge 1070 than proximal edge 1072 and cut-out portion 1060b is located on boss tower 1036 in closer proximity to proximal edge 1072 than distal edge 1070. As also illustrated, cut-out portion 1060c radially opposes cut-out portion 1060d on boss tower 1036 and is in closer proximity to second later edge 1076 than first lateral edge 1074 and cut-out portion 1060d is located on boss tower 1036 in closer proximity to first lateral edge 1074 than second lateral edge 1076.

Figure 15:
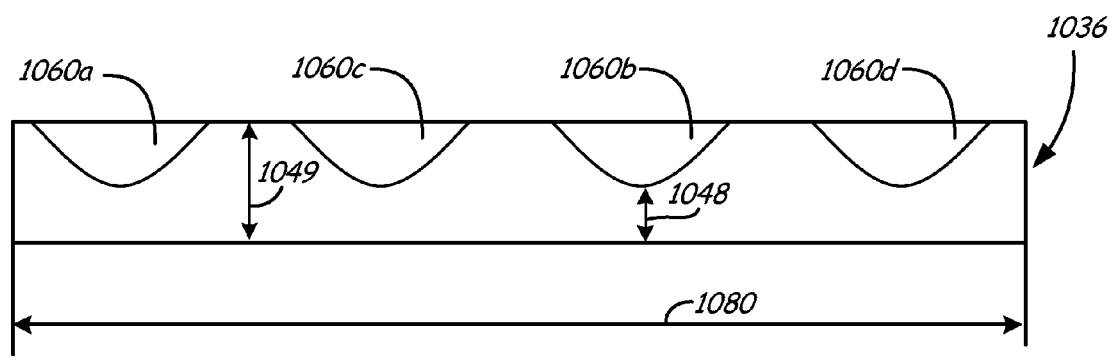
FIG. 15 illustrates a schematic diagram of a perimeter of a boss tower of the mount plate illustrated in FIG. 14G.

FIG. 15 illustrates a schematic diagram of a perimeter 1080 of boss tower 1036 of mount plate 1032 illustrated in FIG. 14G. In particular, FIG. 15 illustrates how the perimeter 1080 varies from a minimum boss height 1048 to a maximum boss height 1049. Each of cut-out portion 1060a, 1060b, 1060c and 1060d represents a portion of the outer surface of boss tower 1036 that is not defined by an outer diameter of boss tower 1036. Each of cut-out portion 1060a, 1060b, 1060c and 1060d also represents a partial reduction in boss height down to minimum boss height 1048.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mount plate comprising:
   a flange having a first surface and an opposing second surface;
   a boss tower having a swage hole and extending from an area where the boss tower meets the first surface of the flange to an end surface of the boss tower, the boss tower comprising:
   an inner diameter defining an inner surface of the swage hole;
   an outer diameter defining a portion of an outer surface of the boss tower; and at least one cut-out portion formed in the boss tower along an obliquely angled plane, the at least one cut-out portion intersecting with the portion of the outer surface defined by the outer diameter at a first area that is located a first distance from where the boss tower meets the first surface of the flange and intersecting with the end surface at a second area that is located a second distance from the inner diameter;

wherein the first distance is less than the second distance; and wherein the first area forms a convex boundary with the outer surface of the boss tower and the second area forms a linear or concave boundary with the end surface of the boss tower.

2. The mount plate of claim 1, wherein the boss tower comprises two cut-out portions located radially opposite from each other.

3. The mount plate of claim 1, wherein the flange further comprises a distal edge, a proximal edge, a first lateral edge and a second lateral edge, wherein the first and second lateral edges couple the distal edge to the proximal edge.

4. The mount plate of claim 3, wherein the at least one cut-out portion is located on the boss tower in closer proximity to the distal edge of the flange than the proximal edge.

5. The mount plate of claim 3, wherein the at least one cut-out portion is located on the boss tower in closer proximity to the proximal edge of the flange than the distal edge.

6. The mount plate of claim 3, wherein the at least one cut-out portion is located on the boss tower in closer proximity to the first lateral edge of the flange than the second lateral edge of the flange.

7. The mount plate of claim 3, wherein the at least one cut-out portion is located on the boss tower in closer proximity to the second lateral edge of the flange than the first lateral edge of the flange.

8. A swage coupling assembly comprising:
a first component having an aperture;
a second component having a plate integrally formed with a boss tower that is configured to be inserted into and swage coupled to the aperture in the first component, wherein the plate has a first surface and an opposing second surface and wherein the boss tower extends from an area where the boss tower meets the first surface of the plate to an end surface of the boss tower, the boss tower comprising:
a swage hole;
an inner diameter defining an inner surface of the swage hole;
an outer diameter defining a portion of an outer surface of the boss tower; and
at least one cut-out portion formed in the boss tower along an obliquely angled plane, the at least one cut-out portion including a lower boundary and an upper boundary, the lower boundary and the upper boundary defining a remaining portion of the outer surface of the boss tower;
wherein the at least one cut-out portion has a length that is less than a circumference of the boss tower;
wherein the lower boundary forms a convex ridge with the portion of the outer surface that is defined by the outer diameter of the boss tower and the upper boundary forms a linear or concave ridge with the end surface of the boss tower; and
wherein only the portion of the outer surface of the boss tower that is defined by the outer diameter engages with the aperture in the first component when the boss tower is inserted and swaged coupled to the aperture in the first component.

9. The swage coupling assembly of claim 8, wherein the at least one cut-out portion intersects with the portion of the outer surface that is defined by the outer diameter of the boss tower at the lower boundary and wherein the at least one cut-out portion intersects with the end surface at the upper boundary.

10. The swage coupling assembly of claim 9, wherein the lower boundary is located a first distance from where the boss tower meets the first surface of the plate and wherein the upper boundary is located a second distance from the inner diameter of the swage hole, the first distance being less than the second distance.

11. The swage coupling assembly of claim 8, wherein the boss tower comprises two cut-out portions located radially opposite from each other.

12. The swage coupling assembly of claim 8, wherein the boss tower comprises four cut-out portions, wherein two of the four cut-out portions are located radially opposite from each other and the other two of the four cut-out portions are located radially opposite from each other.

13. A method of coupling two components, the method comprising:
inserting a boss tower of a first component into an aperture in a second component, the boss tower extending from an area where the boss tower meets a first surface of a flange to an end surface of the boss tower and having a swage hole, the boss tower comprising:
an inner diameter defining an inner surface of the swage hole;
an outer diameter defining a portion of an outer surface of the boss tower; and
at least one cut-out portion formed in the boss tower along an obliquely angled plane, the at least one cut-out portion intersecting with the outer surface at a first area that is located a first distance from where the boss tower meets the first surface of the flange and intersecting with the end surface at a second area that is located a second distance from the inner diameter;
wherein the first distance is less than the second distance;
wherein the first area forms a convex boundary with the outer surface of the boss tower and the second area forms a linear or concave boundary with the end surface of the boss tower; and
swaging the boss tower of the first component to the aperture in the second component.

14. The method of claim 13, wherein swaging the boss tower of the first component to the aperture in the second component comprises ball swaging the boss tower of the first component to the aperture in the second component by inserting a swage ball having a diameter that is greater than the inner diameter of the swage hole into the swage hole.

15. The method of claim 14, further comprising engaging only the portion of the outer surface of the boss tower that is defined by the outer diameter with the aperture in the second component after the swage ball is inserted into the swage hole.

16. The method of claim 13, wherein inserting the boss tower of the first component into the aperture in the second component comprises engaging only the portion of the outer surface of the boss tower that is defined by the outer diameter with the aperture in the second component.

* * * * *